(12) United States Patent
Nayak et al.

(10) Patent No.: US 12,230,139 B2
(45) Date of Patent: Feb. 18, 2025

(54) PREDICTING TRAFFIC VIOLATION HOTSPOTS USING MAP FEATURES AND SENSORS DATA

(71) Applicant: HERE Global B.V., Eindhoven (NL)

(72) Inventors: Amarnath Nayak, Mumbai (IN); Jerome Beaurepaire, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 611 days.

(21) Appl. No.: 17/529,989

(22) Filed: Nov. 18, 2021

(65) Prior Publication Data

US 2023/0154332 A1 May 18, 2023

(51) Int. Cl.
| | |
|---|---|
| *G08G 1/01* | (2006.01) |
| *G06N 20/00* | (2019.01) |
| *G08G 1/0967* | (2006.01) |
| *G08G 1/0968* | (2006.01) |
| *G08G 1/16* | (2006.01) |

(52) U.S. Cl.
CPC ............. *G08G 1/166* (2013.01); *G06N 20/00* (2019.01); *G08G 1/0112* (2013.01); *G08G 1/0129* (2013.01); *G08G 1/0133* (2013.01); *G08G 1/096716* (2013.01); *G08G 1/096888* (2013.01)

(58) Field of Classification Search
CPC .... G08G 1/166; G08G 1/0112; G08G 1/0129; G08G 1/0133; G08G 1/096716; G08G 1/096888; G08G 1/052; G06N 20/00; G06N 3/0464; G06N 3/0475; G06N 3/084
See application file for complete search history.

(56) References Cited

U.S. PATENT DOCUMENTS

| | | | |
|---|---|---|---|
| 9,928,735 B2 | 3/2018 | Wang | |
| 2010/0227593 A1* | 9/2010 | Myr | G08G 1/052 455/414.1 |
| 2013/0093895 A1 | 4/2013 | Palmer et al. | |
| 2016/0379485 A1* | 12/2016 | Anastassov | G08G 1/0129 701/117 |
| 2019/0325754 A1* | 10/2019 | Aoude | G08G 1/0137 |
| 2023/0033672 A1* | 2/2023 | Nayak | G08G 1/0175 |

FOREIGN PATENT DOCUMENTS

| | | | | |
|---|---|---|---|---|
| CA | 3093836 A1 * | 9/2019 | ......... | G06K 9/00335 |
| CA | 3122346 C * | 1/2023 | ............ | G06N 20/00 |
| CN | 112016735 A | 12/2020 | | |
| IN | 202021009619 B | 3/2020 | | |

OTHER PUBLICATIONS

Jiang et al., "iTV: Inferring Traffic Violation-Prone Locations With Vehicle Trajectories and Road Environment Data", IEEE Systems Journal, Sep. 2021, 12 pages, vol. 15, No. 3.
Srikanth et al., "Don't Cross that Stop Line: Characterizing Traffic Violations in Metropolitan Cities", Jan. 31, 2020, 9 pages.

* cited by examiner

*Primary Examiner* — Justin Holmes

(57) ABSTRACT

System and methods for determining traffic violation hotspots based on roadway feature and/or sensor data. Traffic violation hotspots include, for example areas where traffic violations are more likely to occur such as traffic light jumping, wrong way driving, over speeding, not wearing seatbelt, avoiding stop signs and red lights, distracted driving, passing other vehicles in a no-passing zone, among others. Traffic violation data from one region is used to train a model that is applied to a second region for which traffic violation data does not exist or is limited.

19 Claims, 11 Drawing Sheets

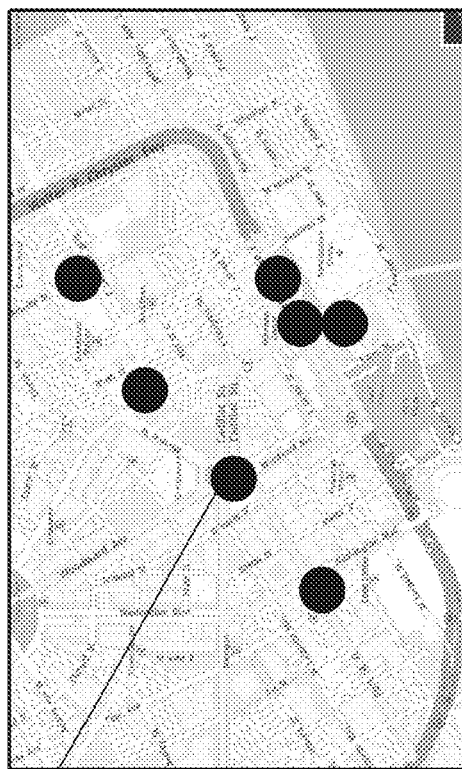
FIG. 2B – Second Region
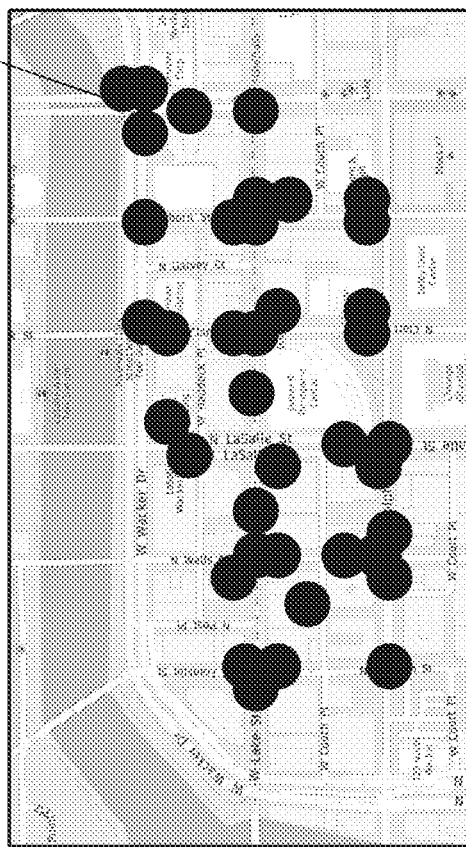
FIG. 2A – First Region
Traffic Violation Data Point 171

PREDICTING TRAFFIC VIOLATION HOTSPOTS USING MAP FEATURES AND SENSORS DATA

FIELD

The following disclosure relates to navigation devices or services.

BACKGROUND

During operation of a vehicle there are driving circumstances that increase the likelihood of traffic violations. As an example, in certain areas, risky traffic situations may be more or less prevalent; for example, less prevalent driving close to schools or in residential areas, but more prevalent driving through intersections and roundabouts, etc. To reduce the frequency, burden, and consequences of traffic violations, it is critical to examine the time, locations, and circumstances of where the traffic violations occur more frequently. Locations that have clusters of high concentrations of violations are commonly known as traffic violation hotspots. Hotspot identification is a vital task for road traffic safety programs. This data, however, may not be readily available, particularly in locations where there has been limited or nonexistent data collection or where government records are not well kept. In an example, vehicles that map and collect data are being rolled out over time to different areas/countries/locations. However, prior to the implementation of an adequately sized fleet of collection vehicles or probes, data for hotspot identification may be limited. Certain areas for which data is readily available may use the traffic violation data to improve the operation of vehicles and the implementation of infrastructure. Areas that do not have this data or are located in a data desert may be left behind.

SUMMARY

In an embodiment, a method is provided for predicting traffic violation hotspots, the method comprising: acquiring historical traffic violation data for a plurality of locations in a first region; training a model to identify traffic violation hotspots using the historical traffic violation data; acquiring real-time data while traversing a location in a second region for which historical traffic violation data is limited; generating, by the trained model using the real-time data, a probability score that represents how probable the location in the second region is to be a traffic violation hotspot; and generating an alert for the location based on the probability score.

In an embodiment, a system is provided for calculating a probability of a traffic violation. The system includes one or more navigation devices and a mapping system that includes a geographic database and a server. The one or more navigation devices are configured to acquire sensor data related a plurality of locations on a roadway. The geographic database is configured to store map feature data for the plurality of locations. The server is configured to store a first machine learning model configured to generate a first probability score when input real-time sensor data for a location for which there is limited traffic violation data. The server is further configured to store a second machine learning model configured to generate a second probability score when input real-time mapping data for the location. The server is configured to provide the first probability score, the second probability score, or the first probability score and the second probability score to the one or more navigation devices.

In an embodiment, an apparatus is provided including at least one processor; and at least one memory including computer program code for one or more programs; the at least one memory configured to store the computer program code configured to, with the at least one processor, cause the at least one processor to: acquire data related to a location of a roadway for a first region; generate, using at least one model trained using machine learning, a probability score for how probable is the location is to be a traffic violation hotspot, the at least one model trained using historical traffic violation data from a second region; determine that the probability score exceeds a threshold score; and generate an alert for the location.

BRIEF DESCRIPTION OF THE DRAWINGS

Exemplary embodiments of the present invention are described herein with reference to the following drawings.

FIGS. 2A and 2B depicts maps with varying levels of traffic violation data.

DETAILED DESCRIPTION

Figure 1:
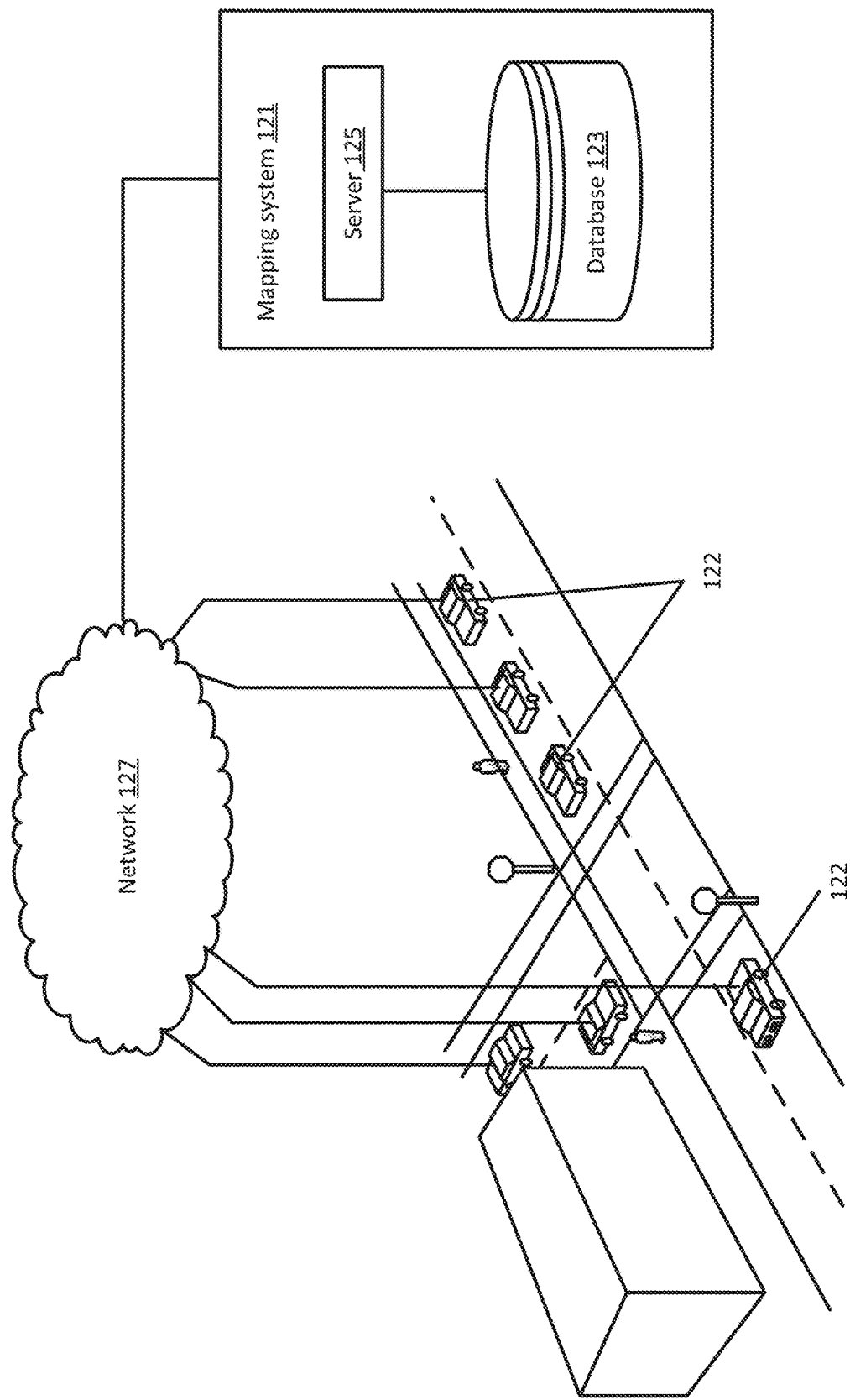
FIG. 1 depicts an example system for predicting traffic violation hotspots according to an embodiment.

Embodiments provide systems and methods for determining traffic violation hotspots based on mapping features and/or sensor data. Traffic violation hotspots include, for example, areas where traffic violations are most likely to occur such as traffic light jumping, wrong way driving, over speeding, not wearing a seatbelt, avoiding stop signs and red lights, distracted driving, passing other vehicles in a no-passing zone, among others. Embodiments include models that are trained on locations for which historical data is available. The models are applied to provide predictions for locations for which historical data is limited or not useable. One key advantage of such a prediction function is that a mapping system does not need to gather lots of historical information for a location before being able to provide a prediction, but rather such a mapping system is able to use the learned features from one location to provide predictions for the different location.

In an embodiment, a mapping system collects historical data of traffic violations at various locations in a first region. This data may be available from multiple different sources such as probe vehicles, reports, government agencies etc. If possible, the data is collected at two levels, vehicle sensor data based and mapping data. Hotspots are identified for which statistics of respective traffic violations for a given area and for a given time are greater than typical. From this collected data and the identified hotspots, the mapping system trains a machine learning model that can predict traffic violation hotspot for new locations in a second region for which traffic violation data is not available.

Such predictions may be used to understand where and how such traffic violations are likely to happen so that agencies can act proactively by, for example, deploying police forces in the area or preparing ambulances or other emergency responses teams in case of accidents, that are then more likely in such areas. Traffic accidents and traffic violations may be directly connected. Risky and aggressive driving behavior of drivers is regarded as the one of the leading causes of road traffic accidents. In some estimates, driver related factors account for more than 90% of crash occurrences. Some of the prevailing driver factors in this regard include traffic violations such as: distracted driving (for example, mobile phone use), drunk driving, driving under fatigue, risky and aggressive driving attitudes that leads to various traffic violations i.e., over-speeding, red-light crossing, non-compliance with pedestrian signals, road markings, etc. These traffic violations and others are reported to have a strong bearing on crash occurrences as well as associated crash severities.

As an example, over-speeding is one of the most prevailing traffic violations encountered which has resulted in a large number of severe and fatal crashes. Speeding not only increases the risk of fatal traffic accidents, but also makes them worse. Studies also suggest that drivers are much more likely to crash while talking on the phone. Another form of distraction which causes many accidents is "rubbernecking," or turning to look at another accident while passing by. Any time a motorist is not focused solely on the road and other vehicles, they are driving while distracted and the consequences are dangerous. Accidents may also cause traffic violations which in return may cause more accidents. In an example, if an accident is detected in a given area on a given lane, it increases the risk of people using the opposite lane to go over it (depending on the area, for example validated by probe data in that area).

One benefit as described above is that agencies can proactively act in new locations using data that has been collected and analyzed in areas that include similar characteristics as the new locations. This reduces the time to apply measures and helps save lives. In addition, such a system helps with increased safety, cheaper simulations and deployment, better predictability, traffic management, better city planning, and providing insurance among other benefits. Another benefit is that agencies may also adjust infrastructure as they may be able to identify or predict that some intersections are likely to see traffic violations before they even happen.

The following embodiments relate to several technological fields including but not limited to navigation, autonomous driving, assisted driving, traffic applications, and other location-based systems. In each of the technologies of navigation services, autonomous driving, assisted driving, traffic applications, and other location-based systems, improved identification of traffic violation hotspots improves the ability of the mapping system to provide a safe and satisfactory trip. In addition, users of navigation, autonomous driving, assisted driving, traffic applications, and other location-based systems are more willing to adopt these systems given the technological advances in improved safety, visualization, and understanding of the roadway.

FIG. 1 depicts a system for predicting traffic violation hotspots for a particular location for which historical traffic violation data is lacking. The system includes at least one or more devices 122, a network 127, and a mapping system 121. The mapping system 121 may include a database 123 (also referred to as a geographic database 123 or map database) and a server 125. Additional, different, or fewer components may be included. The mapping system 121 is configured to generate prediction models for traffic violation hotspots in areas in which historical data is limited or not useful using machine learning techniques and historical data collected by the one or more devices 122 and data stored in the geographic database 123. A device 122 traveling the roadway applies the prediction models in order to understand the upcoming roadway based on sensor data and/or roadway feature data collected by the device 122.

In an embodiment, map features are used for predicting traffic violations for a particular location for which historical traffic violation data is lacking. Historical traffic violation data for one or more locations is identified. Traffic violations are quantified for a given time and area along with legal driving maneuvers. Traffic violation statistics (mean, median, standard deviations) are calculated for various times (e.g., each hour) for each location. If the statistics of the traffic violation for the location and for the given time is same (or less) as that of the nation (or county or state) statistics, then the location may not be flagged. If the statistics of the traffic violation for the given location and for the given time is greater than that of the nation (or county or state) statistics, then the location may be flagged as mild traffic violation zone, moderate traffic violation zone, or high traffic violation zone. A traffic violation hotspot is a location for which any vehicle that traverses the location is more likely to violate a traffic law than in a different location. As an example, certain locations may be more susceptible to speeding than other locations. Certain intersections may be more susceptible to vehicles running a stop sign or light, etc. A traffic violation hotspot does not mean that any vehicle will violate a traffic law, but only that over time, the number of vehicles that do violate a traffic law is greater than normal given region wide driving statistics. For identifying locations, the map features of interest may include, for example, a functional class of the link/roadway, a category of the location (traffic light, roundabout, other junctions, toll plaza), the number of lanes, the legal speed limit, the travel direction, the presence of a physical divider, among others. Using these features, a machine learning model is developed that can predict traffic violation hotspots for locations that lack or for which there is limited historical traffic violation data. For example, a newly built (or planned) roadway may lack historical data for traffic violations since the roadway has experienced limited usage or traffic. In another example, an entire area may lack traffic violation data due to an insufficient fleet of probe vehicles or an insufficient record keeping apparatus. Once the model is trained on the first region, it is deployed to the second region. When a vehicle approaches a particular location in the second region, the map features of the particular location are extracted and sent as an input to the trained machine learning model. The machine learning model provides a prediction or probability score (for example, in a range of 0 to 1) on how probable is the location likely to be a traffic violation hotspot (based, for example, on its similarity to locations in the first region that are identified as hotspots). If the probability exceeds a threshold, then the vehicle or the driver may be warned about it or instructed to perform a maneuver.

In an embodiment, vehicle sensor data is used for predicting traffic violation hotspots for a particular location for which historical traffic violation data is lacking. Historical vehicle sensor data is acquired, and map matched to locations. Similar to the above embodiment using map features, traffic violations are quantified for a given time and location. Traffic violation statistics (mean, median, standard deviations) are calculated for various times (e.g., each hour) for each given location or area. If the statistics of the traffic violation for the given location and for the given time is same (or less) as that of the nation (or county or state) statistics, then the location is not flagged. If the statistics of the traffic violation for the given location and for the given time is greater than that of the nation (or county or state) statistics, then the location (or area) is flagged as mild traffic violation zone, moderate traffic violation zone, or high traffic violation zone. A model is trained to predict traffic violations for a vehicle based on the acquired sensor data and the annotated hotspot information. The sensor data may include (but are not limited to) a vehicle's speed, a vehicle's heading degree, a friction value (braking pattern) for example indicating a slippery road condition, the operation or status of a windshield wiper (for example, to detect if the road is wet due to rain), the presence of a weather condition, the status of fog lights—ON/OFF (for example, to detect if there is low visibility due to fog, the status or operation of an anti-brake system data (ABS), and/or an average number of lane changes in a period of time among other types of vehicle sensor data. Using these features, a machine learning model is developed that can predict traffic violation hotspots for locations that lack or for which there is limited historical traffic violation data. For example, a newly built (or planned) roadway may lack historical data. In another example, an entire area may lack traffic violation data due to an insufficient fleet of probe vehicles or an insufficient record keeping apparatus. Once the model is trained on the first region, it is deployed to the second region. When a vehicle approaches a particular location in the second region, the sensor data for the vehicle is identified and sent as an input to the trained machine learning model. The machine learning model provides a prediction or probability score (for example, in a range of 0 to 1) on how probable is the location likely to be a traffic violation hotspot (based, for example, on its similarity to sensor data and traffic violations in the first). If the probability exceeds a threshold, then the vehicle or the driver may be warned about it or instructed to perform a maneuver.

In another embodiment, a machine learned model is trained using both the map feature data and the sensor data for a first region. In real-time, both inputs from a second region are used to provide a prediction to the vehicle or driver. Embodiments allows users to benefit from increased safety by dynamically determining the areas where traffic violations are most likely to occur.

The one or more devices 122 may include probe devices 122, probe sensors, IoT (internet of things) devices 122, or other devices 122 such as personal navigation devices 122 or connected vehicles. The device 122 may be a mobile device or a tracking device that provides samples of data for the location of a person or vehicle. The devices 122 may include mobile phones running specialized applications that collect location data as the devices 122 are carried by persons or things traveling a roadway system. The one or more devices 122 may include traditionally dumb or non-networked physical devices and everyday objects that have been embedded with one or more sensors or data collection applications and are configured to communicate over a network 127 such as the internet. The devices 122 may be configured as data sources that are configured to acquire sensor data and/or roadway feature data. These devices 122 may be remotely monitored and controlled. The devices 122 may be part of an environment in which each device 122 communicates with other related devices in the environment to automate tasks. The devices 122 may communicate sensor data to users, businesses, and, for example, the mapping system 121.

The one or more devices 122 are configured to collect data related to traffic violations by, for example, a vehicle 124 that the device 122 is embedded with or otherwise traveling with, or for example, other vehicles on the roadway with sensor range of a device 122. The traffic violations may include any potential traffic violation for a given area. Some examples include speeding, failure to stop at a red light, failure to signal, and reckless driving that includes tailgating, illegal passing, driving the wrong way down a one-way street, passing on a curve, using the opposing traffic lanes to pass drivers, weaving in and out of traffic, and driving on the shoulder among other maneuvers.

Traffic violations may be self-identified or may be reported on by other vehicles or sensors. In an example, a device 122 may detect that the device 122 or vehicle 124 is exceeding a speed limit for certain area. The device 122 records the speed, the location, sensor data, and other feature data about the event. In another example, a device 122 may detect that another vehicle failed to stop at a red light. The device 122 records the location, sensor data (for example image data), and other feature data about the event. In both cases, the device 122 may package the event data into a report that details not only the traffic violation, but also sensor and roadway feature data that describes the circumstances (herein referred to traffic violation data). The device 122 is configured to transmit the traffic violation data to the server 125 or mapping system 121 for aggregation with other traffic violation data in order to train or configure a traffic violation prediction model.

One or more of the devices 122 may also be configured to provide probe reports to the mapping system 121 while traversing a roadway network. The probe reports may be similar to the traffic violation data, for example, including sensor and feature data about the roadway. Probe reports, however, may or may not indicate or identify a traffic violation. Analysis of the probe data to determine if a traffic violation occurred may be performed at a later time after collection. Each vehicle and/or mobile device 122 may include position circuitry such as one or more processors or circuits for generating probe data. The probe data may be generated by receiving Global Navigation Satellite System (GNSS) signals and comparing the GNSS signals to a clock to determine the absolute or relative position of the vehicle and/or mobile device 122. The probe data may be generated using embedded sensors or other data relating to the environment of a vehicle or device 122. The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). The probe data may also describe the speed, or velocity, of the mobile device 122. The speed may be determined from the changes of position over a time span calculated from the difference in respective timestamps. The time span may be the predetermined time interval, that is, sequential probe data may be used. In some examples, the probe data is collected in response to movement by the device 122 (i.e., the probe report's location information when the device 122 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

The one or more devices 122 may also be configured to acquire image data using one or more cameras embedded in or in communication with the one or more devices 122. The image data may be included with the traffic violation data and may be transmitted to the mapping system 121 for storage in the geographic database 123 and processing by the server 125. The image data may include metadata, for example, attributes about an image, such as its height and width, in pixels. The metadata may describe the content of the image, the date and time of the image, etc.

The one or more devices 122 may be in communication with the sensors or may directly acquire information. In an example, the one or more devices 122 may communicate with a vehicle's engine control unit (ECU) that controls a series of actuators on an internal combustion engine to ensure optimal engine performance. The ECU data may be provided in the traffic violation reports. In another example, the one or more devices 122 may communicate with a seat belt sensor that detects when a metal buckle of the seat belt is inserted into the female portion of the seat belt. If a detects an occupant seated in the driver or front passenger seat while the vehicle is in motion, but the seat belt is not buckled in, the device 122 may identify that a seat belt violation has occurred. A sensor may detect if a driver or passenger is paying attention. For example, an image sensor may track the gaze of a driver, or a sensor may detect if the driver's hands are on or in a correct position on the steering wheel. A headlight sensor, wiper sensor, fog light sensor, etc. may also communicate with the one or more devices 122. These sensors may provide data that details a violation or data that provides background data for the traffic violation event such as weather conditions.

The one or more devices 122 may communicate probe data/reports and traffic violation data relating to traffic violations to the server 125 or mapping system 121. The information may be anonymous, for example detailing a violation, location, and other sensor data, but without personal or privacy related data. The traffic violation data is thus not used for citations or prosecutions, but rather as an important data point in understanding where, when, and how traffic violations occur. The traffic violation data may also be combined with actual traffic violation citations recorded, for example, by an authority or roadway governance body.

To communicate with the devices 122, systems or services, the mapping system 121 is connected to the network 127. The mapping system 121 may receive or transmit data through the network 127. The mapping system 121 may also transmit paths, routes, or traffic violation data through the network 127. The mapping system 121 may also be connected to an OEM cloud that may be used to provide mapping services to vehicles via the OEM cloud or directly by the mapping system 121 through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network such as Zigbee, Bluetooth Low Energy, Z-Wave, RFID and NFC. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols. The devices 122 may use Vehicle-to-vehicle (V2V) communication to wirelessly exchange information about their speed, location, heading, and roadway conditions with other vehicles, devices 122, or the mapping system 121. The devices 122 may use V2V communication to broadcast and receive omni-directional messages creating a 360-degree "awareness" of other vehicles in proximity of the vehicle. Vehicles equipped with appropriate software may use the messages from surrounding vehicles to determine potential threats or obstacles as the threats develop. The devices 122 may use a V2V communication system such as a Vehicular ad-hoc Network (VANET).

The probe data/reports, traffic violation data, and other data is stored in the geographic database 123. The geographic database 123 is configured to store and provide information to and from at least the mapping system 121, server 125, and devices 122. The geographic database 123 may store and organize the traffic violation data received from the devices 122 and/or processed by one or more models provided by the mapping system 121. The geographic database 123 may include one or more indexes of geographic data. The indexes may include various types of indexes that relate the different types of data to each other or that relate to other aspects of the data contained in the geographic database 123. The indexes may include, for example, data relating to points of interest or roadway features. The point of interest data may include point of interest records including, for example, a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The geographic database 123 provides data for the traffic violation model. The mapping data may include road types, road layouts, lane features, traffic lights/stop signs, etc. The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway.

The geographic database 123 may include data for multiple different regions, areas, or locations. Different locations may include different levels of traffic violation data. In an embodiment, certain locations may include limited or incomplete data for traffic violations. This may be because certain locations have been traversed more often, records are better kept, etc. Different regions, countries, etc. may also provide different levels or amounts of traffic violation data. One city may keep excellent records and may include an adequate fleet of probe vehicles. Another city may keep terrible records and may lack an adequate fleet of probe vehicles. The first city may be able to provide sufficient data to allow a model to make accurate predictions for traffic violations. The second city, however, may not possess enough data or enough quality data to train a model. In an embodiment, the data from the first city may be used to train a model that is then applied to the second city, alleviating the need to acquire traffic violation data for the second city before providing predictions. The following examples use two different regions as this is one scenario. However, the model may be trained on locations in a first region and then applied to other locations in the first region that for one or more reasons do not have adequate traffic violation data. In an example, a city or agency may setup a system to acquire traffic violation data for a handful of intersections. The city or agency may be limited in its ability to cover all intersections as this may be cost prohibitive. However, the data acquired from this minority of intersections may then be applied to other intersections even though actual traffic violation data is absent from those locations.

FIGS. 2A and 2B depicts an example of a first region and a second region respectively. FIGS. 2A and 2B also depict several traffic violation data points. A region or location may include hundreds, thousands, or more traffic violation datapoints in order to have sufficient data to train a model. As depicted, the first region in FIG. 2A has a plethora of traffic violation data points 171. The model may be trained using feature data and/or sensor data that relates to each traffic violation event. The second region, however, depicted in FIG. 2B does not have many traffic violation data points 171 and thus any model derived therefrom may be inaccurate. The second region (assuming similar driving behavior) may use a model generated from the data points of the first region to predict traffic violation hotspots.

The data from the geographic database 123 may be analyzed and/or processed by the mapping system 121, for example by the server 125, in order to provide mapping services such as hotspot or traffic violation predictions. The mapping system 121 may include multiple servers 125, workstations, databases, and other machines connected together and maintained by a map developer. The mapping system 121 may be configured to acquire and process data relating to roadway or vehicle conditions. For example, the mapping system 121 may receive and input data such as vehicle data, user data, weather data, road condition data, road works data, traffic feeds, etc. The data may be historical, real-time, or predictive. The data may be stored in an HD map, in a location graph, or in the geographic database 123 for use in location-based services and navigation-based services. The mapping service may also provide information generated from attribute data included in the database 123.

The server(s) 125 may be a host for a website or web service such as a mapping service and/or a navigation service. The mapping service may provide standard maps or HD maps generated from the geographic data of the database 123, and the navigation service may generate routing or other directions from the geographic data of the database 123. The mapping service may also provide information generated from attribute data included in the database 123. The server 125 may also provide historical, future, recent or current traffic conditions for the links, segments, paths, or routes using historical, recent, or real-time collected data. The server 125 is configured to communicate with the devices 122 through the network 127. The server 125 is configured to receive a request from a device 122 for a route or maneuver instructions and generate one or more potential routes or instructions using data stored in the geographic database 123. The server 125 may also be configured to provide up to date information and maps to external geographic databases or mapping applications.

In an embodiment, the server 125 is configured to receive traffic violation data from devices 122 for a first region or location. The server 125 is configured to store, adjust, and implement at least one machine learning model that is configured to determine the areas where traffic violations are most likely to occur. The server 125 is configured to use data (map feature/sensor) from a first region, area, location for which there is identified and verified traffic violation data. The server 125 uses a model to learn or identify which features or sensor data are predictive of traffic violations for the first region, area, location. The learned features/sensor data are then applied to a second region, area, location for which there is no identified traffic violation data or limited data. In an example, the mapping system 121 may collect or otherwise acquire traffic violation data for a first city. The traffic violation data may include the type of traffic violation, the location, and any sensor data acquired therein (for example, the speed, heading, lights, etc. data from a device). The server 125 trains a model to identify which location features and sensor data are predictive (e.g., lead to) of traffic violation events. A certain type of roadway feature and driver behavior, for example, may more often than not be predictive of a traffic violation. The server 125 translates these learned features about locations and vehicle behavior (sensor data) for the first region into a predictive model for a second region. In this way, the server 125 is able to provide predictions for traffic violations hotspots for the second region even though actual traffic violation data for the second region is not available or is insufficient.

In an embodiment, a model is used that is configured to predict traffic violations for a particular region based on only map features. The map features of interest may include a functional class of a road, category of a road (traffic light, roundabout, other junctions, toll plaza), the road layout, a number of lanes, a speed limit, a travel direction, a presence of a physical divider (yes/no), among other roadway features. Using these features for a first region/location, a machine learning model is trained that predicts traffic violation hotspots given new feature data for a second region/location. Once the model is trained on data from a first region with annotated or identified actual traffic violation events, it is deployed on the mapping system 121 to predict traffic violation hotspots in a second region for which there is limited or non-existent traffic violation data. When a vehicle approaches a particular place of interest in a second region (intersection, roundabout, junctions), the map features of the location are extracted and sent as an input to the trained machine learning model provided by the mapping system 121. In an embodiment, the machine learning model provides a probability score (in a range of 0 to 1) on how probable the location is to be a traffic violation hotspot. For example, if the probability is greater than, for example, 75% then the vehicle or the driver is warned about it. Based on the training data that included annotated data such as known traffic violation data from the first region, the model learns which map features (among the ones listed above but also any other map feature data available) are the most relevant based on the correlations between those features and specific or general traffic violations. Once those map features are identified and properly weighted, the model applies the correlations to make the predictions for the second region.

In an embodiment a model is used that is configured to predict traffic violation for a particular region based on only sensor data. A vehicle sensor's data are collected for a radius, for example 10, 50, 100, 500 meters, from an upcoming location. In an example, if a location (x,y) is to be evaluated whether it is a traffic hot-spot or not then all the vehicle sensor data is collected at a radius of 500 meters from the point (x,y). The sensor feature data may include (but are not limited to): vehicle speed (average values calculated for either direction and are recorded separately), heading degree (average values are calculated for either direction and are recorded separately), friction (braking pattern)—slippery road condition, windshield wiper (for example, to detect if the road is wet due to rain) weather condition, fog lights—ON/OFF (for example, to detect if there is low visibility due to fog or other weather condition, anti-brake system data (ABS), for example that related to a slippery road condition, an average number of lane changes in a time period, congestion (number of vehicle on a segment of, for example, 100 meters), among others. The model is trained on a multitude (hundreds, thousands, etc.) of such locations with the sensor data and traffic violation data for the first region. In application, when a vehicle approaches a junction or a traffic light (a potential traffic violation hot spot) in a second region, the model collects the vehicle sensor data of all the vehicles and feeds the input data to the trained model. The output of the model may be a probability (in the range of 0 to 1) of the location being a traffic violation hotspot. If the probability is greater than, for example, 75% then the location is flagged as a traffic violation hotspot.

In an embodiment, a combination that leverages both the mapping data (e.g., static features) with more dynamic and contextual sensor data (captured by vehicles on the road near the areas of interest), is used. The mapping system 121 combines the probability provided by a map feature model and a sensor data model, for example with a simple weighted average. In an example both models may carry an equal weight of 0.5. For example, if a map feature model gives the output as 0.8 and a sensor data model gives the output as 0.75 then the combination will calculate the combined probability as 0.5*0.8+0.5*0.75=0.775.

Different probabilities and thresholds may be used for determining when an area or location is a hotspot. Probabilities and thresholds may, for example, be relative for an area compared to other nearby areas. For example, in a region with a low level of traffic violations, a certain location may still have a low probability of traffic violations but still be very high compared to other locations. Conversely, in a region with a high level of traffic violations, every area or location may pass a threshold for the low-level area and as such a higher threshold may be used to differentiate locations from one another and where they sit on a ranking of traffic violation hotspots. As described above, the first region and second region may both include drivers/vehicles with similar driving techniques and locations with similar features/configurations. The thresholds may thus be similar. However, if the first region and the second region include distinct features or driver behavior, the thresholds may vary due to the uncertainty about the predictions.

In an embodiment, the models are trained using machine learning techniques. The models may be, for example, classifiers that are trained using supervised learning. The models may classify, based on the input sensor or map feature data, whether or not an area is a hotspot for traffic violations (or individually for each different violation). The model(s) may include a neural network that is defined as a plurality of sequential feature units or layers. Sequential is used to indicate the general flow of output feature values from one layer to input to a next layer. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous and/or subsequent layer or unit. Skip connections may be used, such as a layer outputting to the sequentially next layer as well as other layers. Rather than pre-programming the features and trying to relate the features to attributes, the deep architecture is defined to learn the features at different levels of abstraction based on the input data. The features are learned to reconstruct lower-level features (i.e., features at a more abstract or compressed level). Each node of the unit represents a feature. Different units are provided for learning different features. Various units or layers may be used, such as convolutional, pooling (e.g., max pooling), deconvolutional, fully connected, or other types of layers. Within a unit or layer, any number of nodes is provided. For example, 100 nodes are provided. Later or subsequent units may have more, fewer, or the same number of nodes.

Unsupervised learning may be used to compute classification, based on the distribution of the samples, using methods such as k-nearest neighbor. In supervised learning, the classification step may happen in the last layer, and takes the key features of the sample as input from the previous layers. There are different classification functions, depending on the use case. An embodiment uses a Softmax function—where for each sample, the result is the probability distribution over the classes.

Different neural network configurations and workflows may be used for the network such as a convolution neural network (CNN), deep belief nets (DBN), or other deep networks. CNN learns feed-forward mapping functions while DBN learns a generative model of data. In addition, CNN uses shared weights for all local regions while DBN is a fully connected network (e.g., including different weights for all regions of a feature map. The training of CNN is entirely discriminative through backpropagation. DBN, on the other hand, employs the layer-wise unsupervised training (e.g., pre-training) followed by the discriminative refinement with backpropagation if necessary. In an embodiment, the arrangement of the trained network is a fully convolutional network (FCN). Alternative network arrangements may be used, for example, a 3D Very Deep Convolutional Networks (3D-VGGNet). VGGNet stacks many layer blocks containing narrow convolutional layers followed by max pooling layers. A 3D Deep Residual Networks (3D-ResNet) architecture may be used. A Resnet uses residual blocks and skip connections to learn residual mapping.

The training data for the model/network (and other networks) includes ground truth data or gold standard data, for example actual detected or identified traffic violation data for a first region. Ground truth data and gold standard data is data that includes correct or reasonably accurate labels that are verified manually or by some other accurate method. Because this type of data may only exist for certain regions, the models cannot be trained locally for each region. However, if the roadway features and vehicle actions/driving standards are similar, the annotated data for a first region may be used to train a model that can then be applied to a second region.

Figure 3:
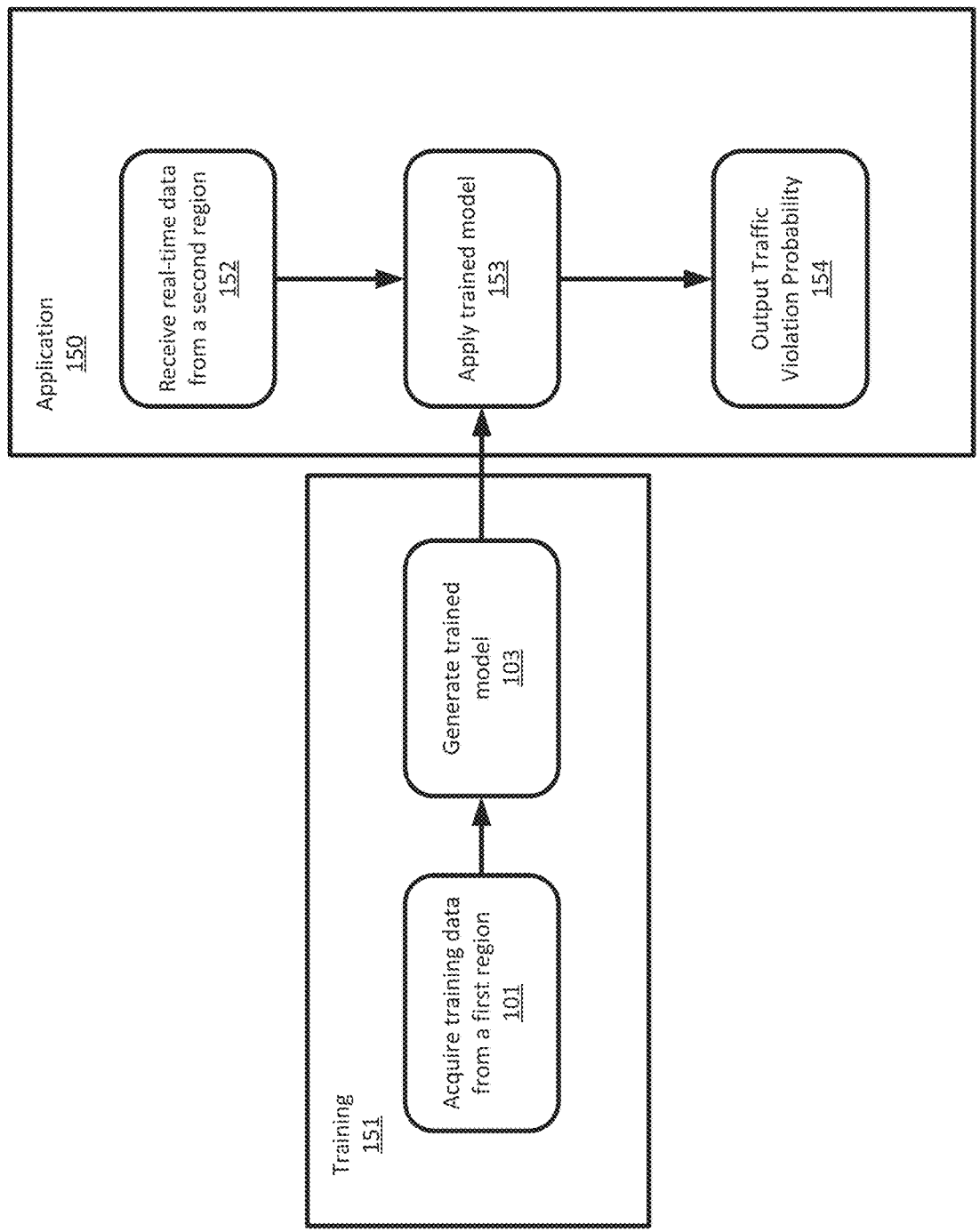
FIG. 3 depicts an example workflow for training and applying a model to output a traffic violation probability according to an embodiment.

The training data may be acquired at any point prior to inputting the training data into the network. FIG. 3 depicts an example of the training and application of the model. The flowchart includes two stages, a training stage 151 for generating or training the model using a collection of training data (labeled data) and an application stage 150 for applying the generated/trained entity matching network to new unseen (unlabeled) data. The training stage 151 includes acquiring 101 training data from a first region and inputting the training data into the model in order to generate 103 a trained model. The output is a trained model that is applied 153 in the application stage 150. The application stage 150 includes receiving a real-time data from a second region, applying 153 the trained model that was trained during the training stage 151 to identify traffic violation probability scores, and outputting the probability 154. The training stage 151 may be performed at any point prior to the application stage 150. The training stage 151 may be repeated after new training data is acquired for the first region or additional regions. New training data may, for example, include traffic violation data from the second region. The application stage 150 may be performed at any point after the training stage 151 generates the trained network and real-time data is received.

In an example operation, one or more of the models are configured as classifiers. The network inputs the training data (e.g., sensor data, features data, or sensor and feature data) and outputs a prediction. The prediction is compared to the annotations from the training data. A loss function may be used to identify the errors from the comparison. The loss function serves as a measurement of how far the current set of predictions are from the corresponding true values. Some examples of loss functions that may be used include Mean-Squared-Error, Root-Mean-Squared-Error, and Cross-entropy loss. Mean Squared Error loss, or MSE for short, is calculated as the average of the squared differences between the predicted and actual values. Root-Mean Squared Error is similarly calculated as the average of the root squared differences between the predicted and actual values. For cross-entropy loss each predicted probability is compared to the actual class output value (0 or 1) and a score is calculated that penalizes the probability based on the distance from the expected value. The penalty may be logarithmic, offering a small score for small differences (0.1 or 0.2) and enormous score for a large difference (0.9 or 1.0). During training and over repeated iterations, the network attempts to minimize the loss function as the result of a lower error between the actual and the predicted values means the network has done a good job in learning. Different optimization algorithms may be used to minimize the loss function, such as, for example, gradient descent, Stochastic gradient descent, Batch gradient descent, Mini-Batch gradient descent, among others. The process of inputting, outputting, comparing, and adjusting is repeated for a predetermined number of iterations with the goal of minimizing the loss function.

One adjusted and trained, the model(s) are configured to calculate traffic violation hotspot predictions. In an embodiment, the traffic violation probabilities may be published in a map update. For example, if the mean of the traffic violation for a given area and for given hour is same (or less) as that of the nation (or county or state) mean then the location is not flagged. If the mean of the traffic violation for a given area and for given hour is greater than that of the national (or county or state) mean then the location (or area) by 15% then it is flagged as mild traffic violation zone. This region may be shown as amber color on the map. If the mean of the traffic violation for a given area and for given hour is greater than that of the national (or county or state) mean then the location (or area) by 25% then it is flagged as moderate traffic violation zone. This region may be shown as light red color on a map. If the mean of the traffic violation for a given area and for given hour is greater than that of the national (or county or state) mean then the location (or area) by 50%+ then it is flagged as high traffic violation zone. This region may be shown as dark red color on the map.

Table 1 below shows some examples of how a location is depicted based on the hour of the day.

| HOUR | MEAN # OF EVENTS | NATIONAL AVERAGE | % OF NATIONAL AVERAGE | RISK AS SHOWN ON MAP |
|---|---|---|---|---|
| 6am to 7am | 15 | 16 | −6% | No flag |
| 7am to 8am | 21 | 22 | −4% | No flag |
| 8am to 9am | 30 | 28 | 7% | Amber flag |
| 9am to 10am | 50 | 43 | 16% | Light red flag |
| 10am to 11am | 45 | 43 | 5% | Amber flag |
| 11am to 12 am | 25 | 28 | −10% | No flag |

Figure 4:
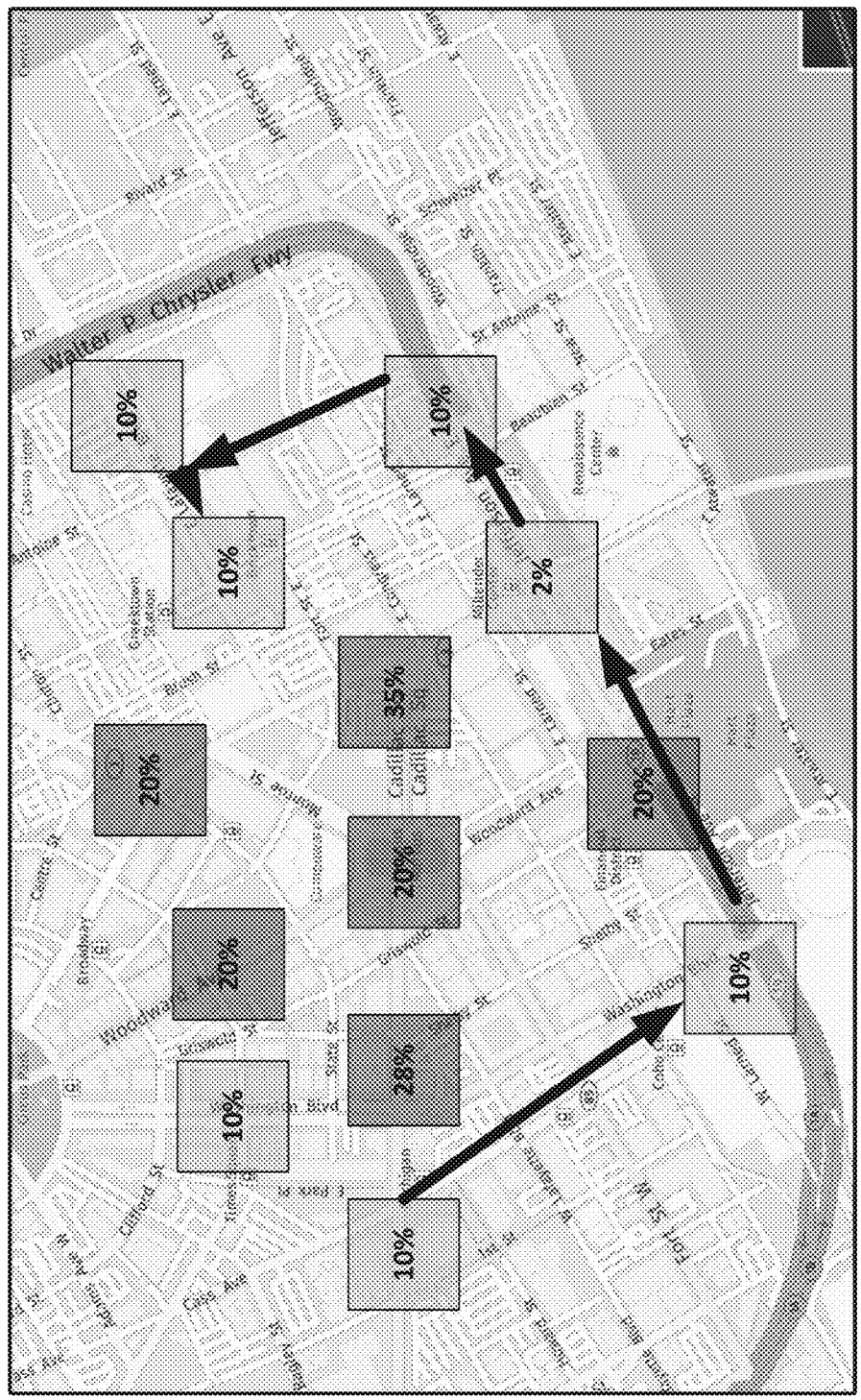
FIG. 4 depicts an example display map including different levels of traffic violation predictions according to an embodiment.

FIG. 4 depicts a map of intersections in the second region that can be displayed with different colors or annotations depending on the risk for a respective time. As depicted, certain intersections are highlighted/shaded differently based on a probability of a traffic violation. Intersections with higher than mean values may be indicated on a map using different colors/annotations/shading etc. As depicted the map includes several different risk levels for different intersections ranging from a 2% decrease to a 35% increase in a risk of a traffic violation. The map display also depicts a suggested route (in the map display as arrows) that takes into account the different probabilities of a traffic violation. As shown, the route avoids the more at-risk intersections in the center instead routing around the perimeter. The traffic violation probabilities may not be definitive but, for example, when a choice between a first route and a second route is identified that otherwise is equal time and distance wise, the lower risk route may be recommended. Different types of displays or interfaces may be used, for example, each road segment may be colored or shaded as opposed to intersections or nodes. Only the highest risk areas may be displayed or recent increases or spikes in the probability.

In an embodiment, during application, the model(s) are used to determine the probability of traffic violation happening at a given location in a second region. If the probability is less than a threshold, then the device 122/vehicle may ignore the warning and the vehicle may continue. If the probability of greater than a threshold, the vehicle determines that the threat from an accident, due to traffic violation hotspot, may be eminent. Co-pending Application U.S. application Ser. No. 17/391,684, incorporated by reference in its entirety, describes using the predicted traffic violation hotspot data for traffic accident prediction.

The predictions may be used for several applications, for example, where authorities want to understand where such traffic violations are likely to happen so that they can act proactively by deploying police forces in the area or preparing ambulances or other emergency responses team in case of accidents. In addition, being able to predict that some intersections are likely to see traffic violations before they even happen can help city planners do a better job in designing new intersections or planning road works and updates. Such learnings made by the models may then be embedded in urban mobility modelling software so that everyone can benefit from it. One key advantage of such a prediction function is that a city does not need to gather lots of historical information for every location before being able to act. The city or organization may already act based on the learnings that have been done in areas which have similar characteristics as described above. This reduces the time to apply measures and helps save lives. Further benefits include increased safety, cheaper simulations and deployment, better predictability, traffic management, better city planning, and better data for businesses such as insurance companies.

The proposed systems and methods develop a predictor based on real-time information related to traffic and traffic incidents. In an embodiment, a warning system provides details of traffic violations to a device 122 as the device 122/vehicle traverses the roadway. For example, a warning may be displayed using a navigation application such as "INCREASED RISK" for a location indicating that there is a greater than the national average risk of wrong way driving taking place on this segment of the roadway.

Figure 5:
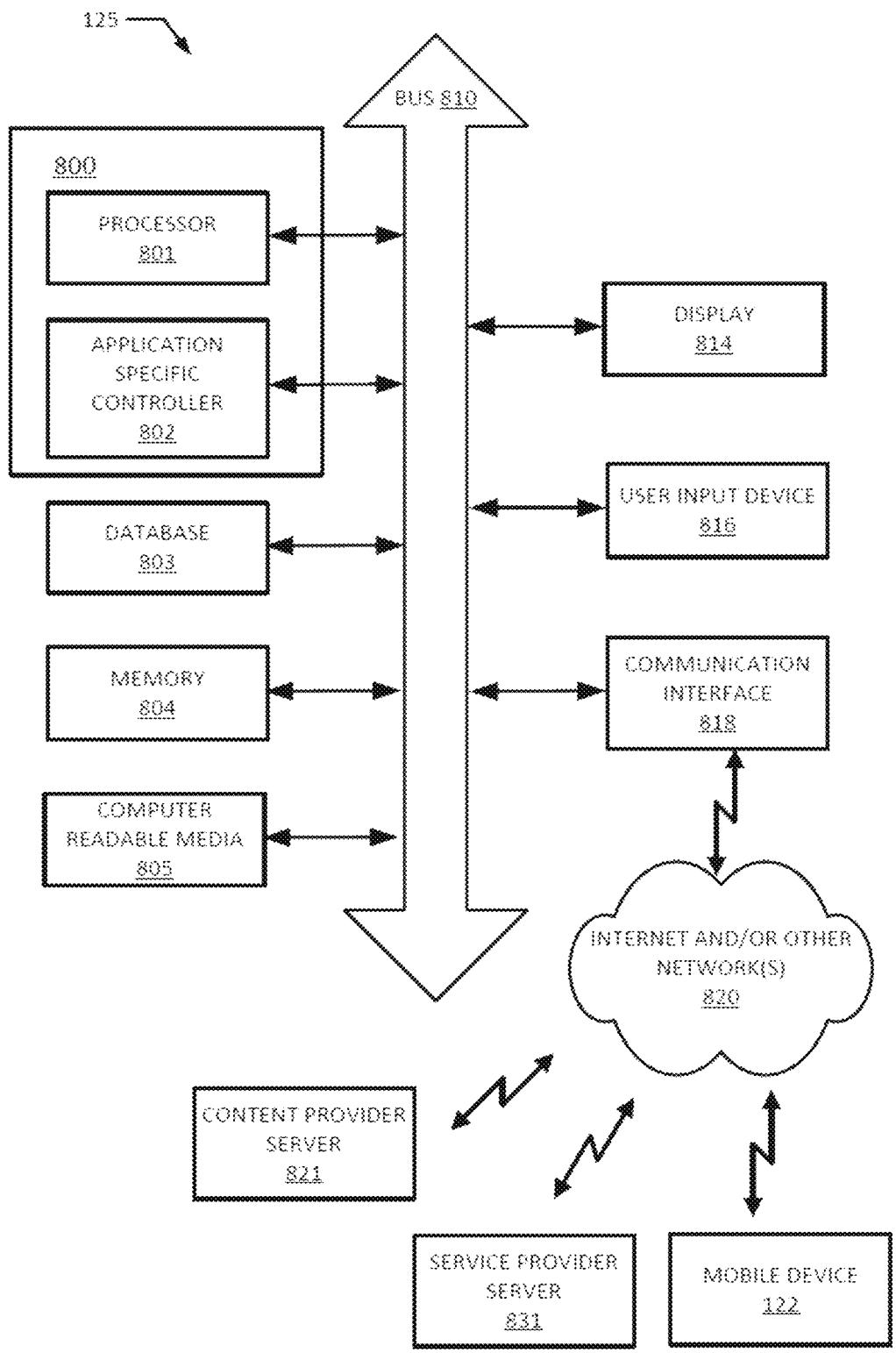
FIG. 5 depicts an example server of FIG. 1 according to an embodiment.

FIG. 5 depicts an example server 125 for the system of FIG. 1 that trains and provides a model that calculates a probability of a traffic violation based on sensor and/or feature data about the roadway. The server 125 may include a bus 810 that facilitates communication between a controller 800 that may be implemented by a processor 801 and/or an application specific controller 802, which may be referred to individually or collectively as the controller 800, and one or more other components including a database 803, a memory 804, a computer readable medium 805, a display 814, a user input device 816, and a communication interface 818 connected to the internet and/or other networks 820. The contents of database 803 are described with respect to database 123. The server-side database 803 may be a master database that provides data in portions to the database of the mobile device 122. Additional, different, or fewer components may be included. The memory 804 and/or the computer readable medium 805 may include a set of instructions that can be executed to cause the server 125 to perform any one or more of the methods or computer-based functions disclosed herein. The server 125 may be in communication through the network 820 with a content provider server 821 and/or a service provider server 831. The server 125 may provide mapping or navigation related services or data to the content provider server 821 and/or the service provider server 831. The content provider may include device manufacturers that provide location-based services.

Figure 6:
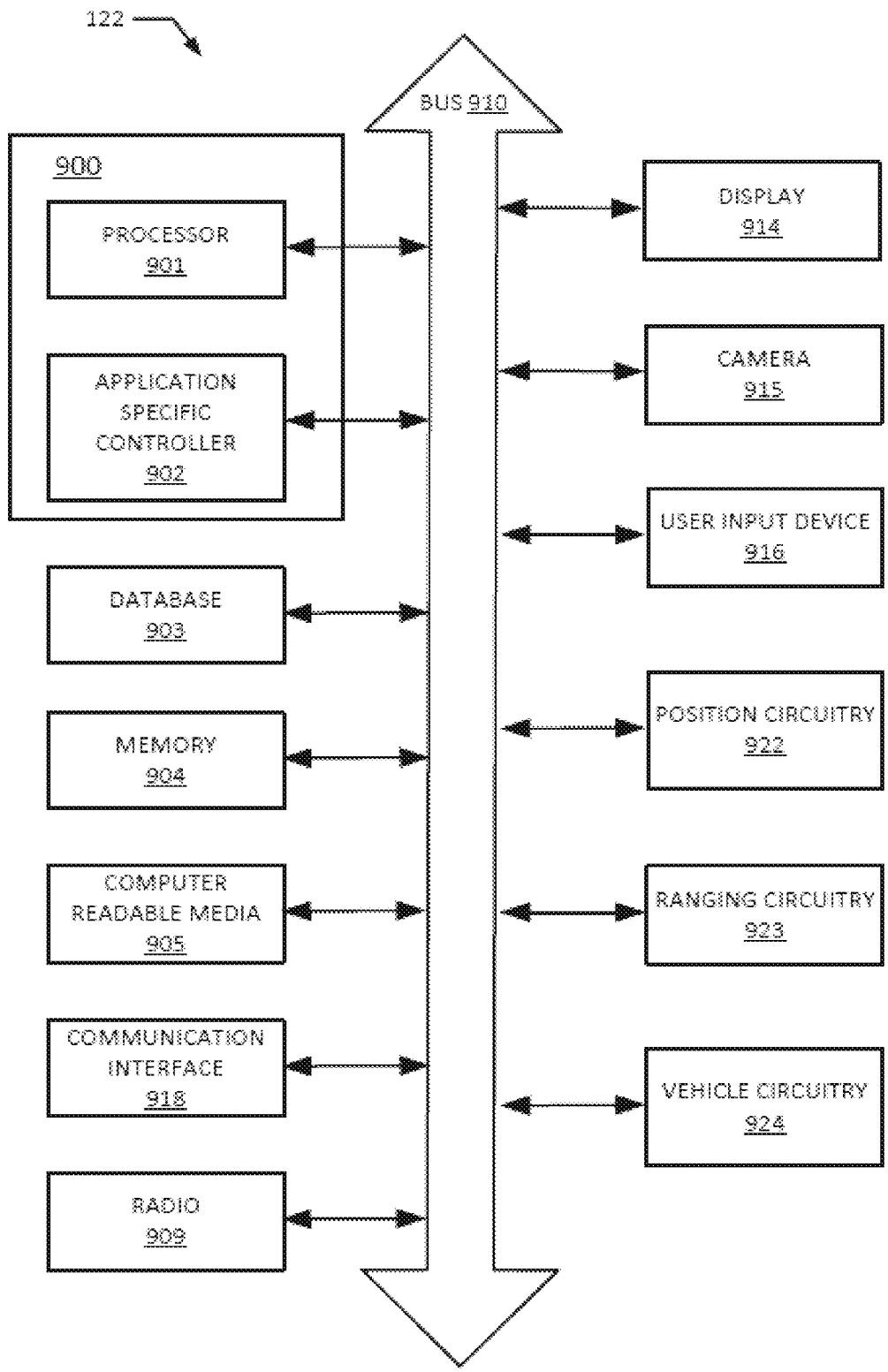
FIG. 6 depicts an example device of FIG. 1 according to an embodiment.

FIG. 6 illustrates an example mobile device 122 for the system of FIG. 1 that calculates a probability of a traffic violation based on sensor and/or feature data about the roadway. The mobile device 122 may include a bus 910 that facilitates communication between a controller 900 that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to the geographic database 123. The device-side database 903 may be a user database that receives data in portions from the database 903 of the mobile device 122. The communication interface 918 connected to the internet and/or other networks (e.g., network 127 shown in FIG. 1). The vehicle circuitry 924 may include any of the circuitry and/or devices described with respect to FIG. 6. Additional, different, or fewer components may be included.

In an embodiment, the server 125 acquires traffic violation data for a first region. The server 125 trains a model that is configured to predict traffic violation hotspots based on feature data or sensor data included with the traffic violation data or otherwise related to a location where a traffic violation occurred. The model is deployed (made available) to one or more devices 122 that are traversing a second region for which there is limited or no traffic violation data. The one or more devices 122 acquire real-time feature data or sensor data which is input into the model. The model returns a prediction for whether or not the location is a traffic violation hotspot.

Figure 7:
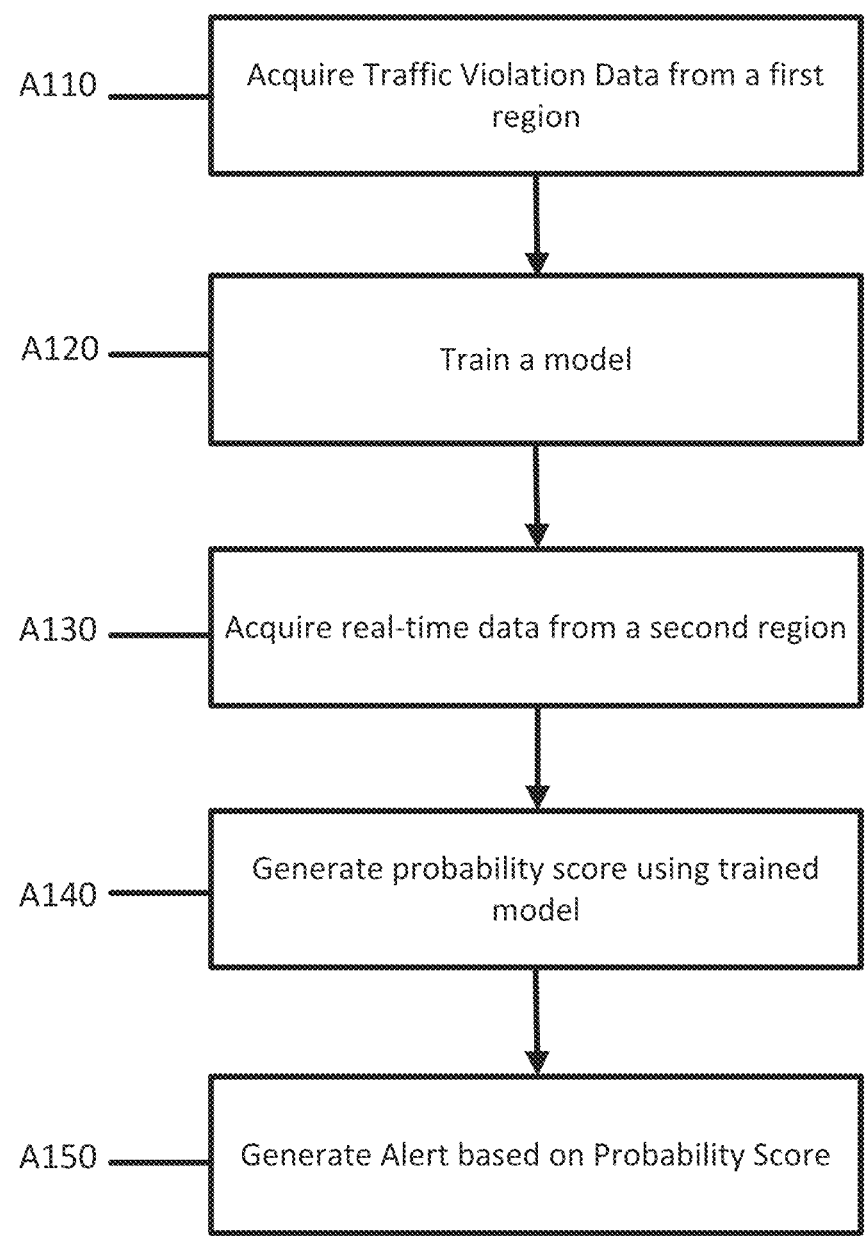
FIG. 7 depicts an example workflow for determining traffic violation hotspots according to an embodiment.

FIG. 7 depicts an example workflow for calculating a probability of a traffic violation based on sensor and/or feature data about the roadway using the server 125 of FIG. 5 and the device 122 of FIG. 6. As presented in the following sections, the acts may also in part be performed using any combination of the components indicated in FIG. 1, FIG. 5, or FIG. 6. For example, certain acts may be performed by the server 125, the device 122, the mapping system 121, or a combination thereof. Additional, different, or fewer acts may be provided. The acts are performed in the order shown or other orders. The acts may also be repeated. Certain acts may be skipped.

The server 125 may be deployed in the cloud and accessible using a network 127 as described above. The server may alternatively operate or as a client user computer in a client-server user network environment, or as a peer computer system in a peer-to-peer (or distributed) network environment. It can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. While a single computer system is illustrated, the term "system" shall also be taken to include any collection of systems or sub-systems that individually or jointly execute a set, or multiple sets, of instructions to perform one or more computer functions.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

At act A110, the server 125 acquires a plurality of traffic violation data from a plurality of locations in a first region. The traffic violation data may be acquired from different sources and may contain different types of data. Each of the data includes an indication of whether or not a traffic violation occurred in some form. For example, actual detected traffic violation data may be acquired from a government agency that includes the type of violation and a location. Traffic violation data may also be derived from data from vehicles or other devices (for example speeding, illegal lane changes, light running, etc.) that may not have been cited (e.g., caught). The traffic violation data may include data where a traffic violation occurred, was estimated to have occurred, or where a traffic violation did not occur.

In an embodiment, the traffic violation data is acquired from devices 122 or probes that traverse the first region. The data acquired by a device 122 may be map-matched to a road segment or node. The device 122 is configured to determine its location and, for example, an upcoming location using the position circuitry 922, ranging circuitry 923, vehicle circuitry 924, and the geographic database 123. The positioning circuitry 922 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 922 may also include gyroscopes, accelerometers, magnetometers, or any other device for tracking or determining movement of a mobile device 122. The gyroscope is operable to detect, recognize, or measure the current orientation, or changes in orientation, of a mobile device 122. Gyroscope orientation change detection may operate as a measure of yaw, pitch, or roll of the mobile device 122.

The device 122 may also be configured to acquire the data for the location using one or more sensors and/or the geographic database 123. The one or more sensors may include ranging circuitry 923, image/video cameras, weather sensors, occupant sensors, and any other vehicle sensor that collects data about the vehicle or the environment around the vehicle. For example, the ranging circuitry 923 may include a LIDAR system, a RADAR system, a structured light camera system, SONAR, or any device configured to detect the range or distance to objects from the mobile device 122. The controller 900 of the device 122 may also communicate with a vehicle engine control unit (ECU) that operates one or more driving mechanisms (e.g., accelerator, brakes, steering device). Alternatively, the mobile device 122 may be the vehicle ECU that operates the one or more driving mechanisms directly.

Figure 8:
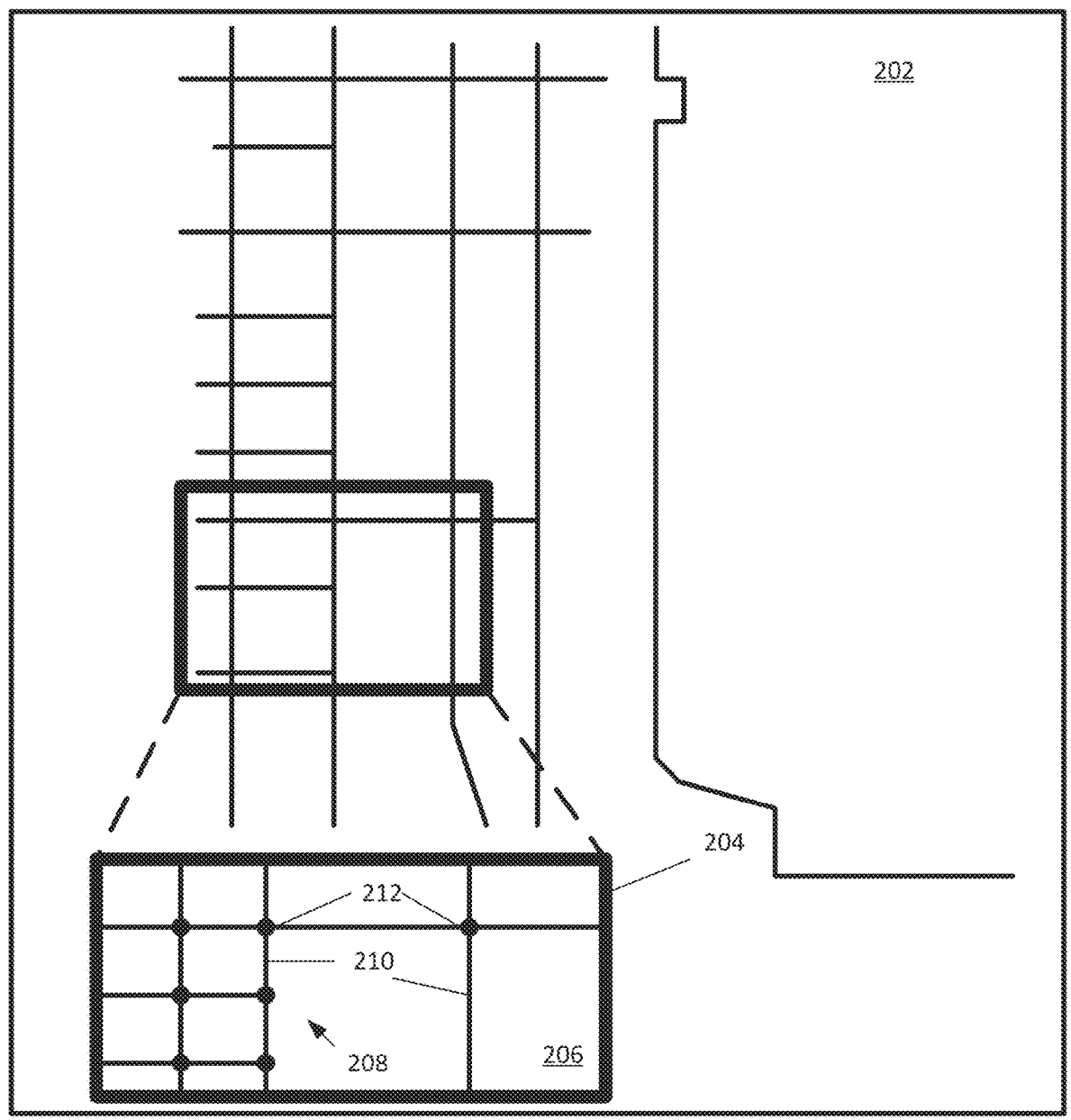
FIG. 8 depicts an example region of a geographic database.

In an embodiment, the traffic violation data comprises map feature data, The map feature data may be acquired from the geographic database 123 and matched to a location for the identified traffic violation location. The geographic database 123 includes information about one or more geographic regions. FIG. 8 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 8 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it one or more nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 9:
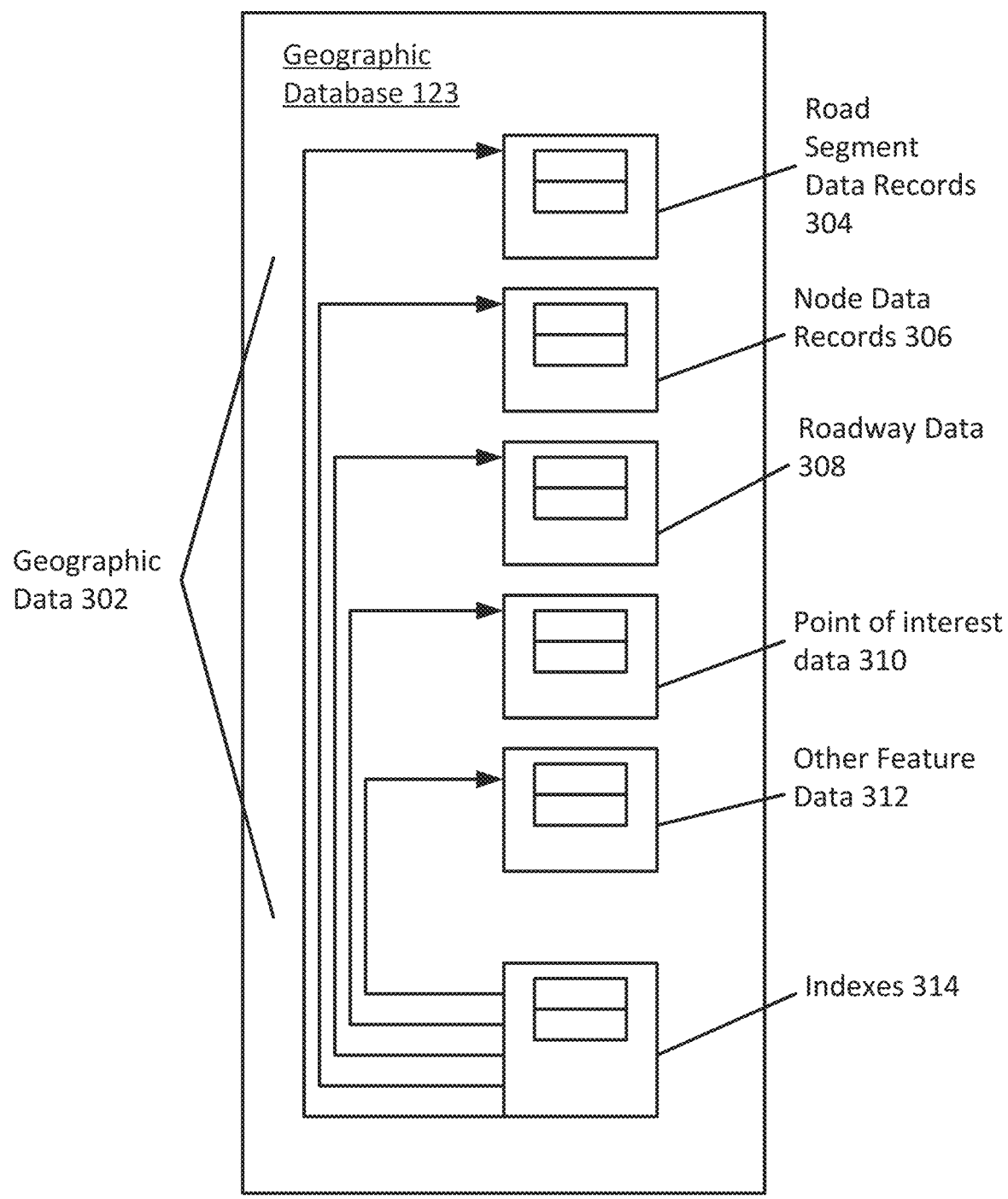
FIG. 9 depicts an example geographic database of FIG. 1.

As depicted in FIG. 9, in one embodiment, the geographic database 123 contains geographic data 302 that represents some of the geographic features in the geographic region 202 depicted in FIG. 8. The data 302 contained in the geographic database 123 may include data that represent the road network 208. In FIG. 9, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include roadway data 308 including signage data, lane data, traffic signal data, physical and painted features like dividers, lane divider markings, road edges, center of intersection, stop bars, overpasses, overhead bridges, etc. The roadway data 308 may be further stored in sub-indices that account for different types of roads or features. The point of interest data 310 may include data or sub-indices or layers for different types of points of interest. The point of interest data may include point of interest records comprising a type (e.g., the type of point of interest, such as restaurant, fuel station, hotel, city hall, police station, historical marker, ATM, golf course, truck stop, vehicle chain-up stations, etc.), location of the point of interest, a phone number, hours of operation, etc. The feature data 312 may include other roadway features.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

Figure 10:
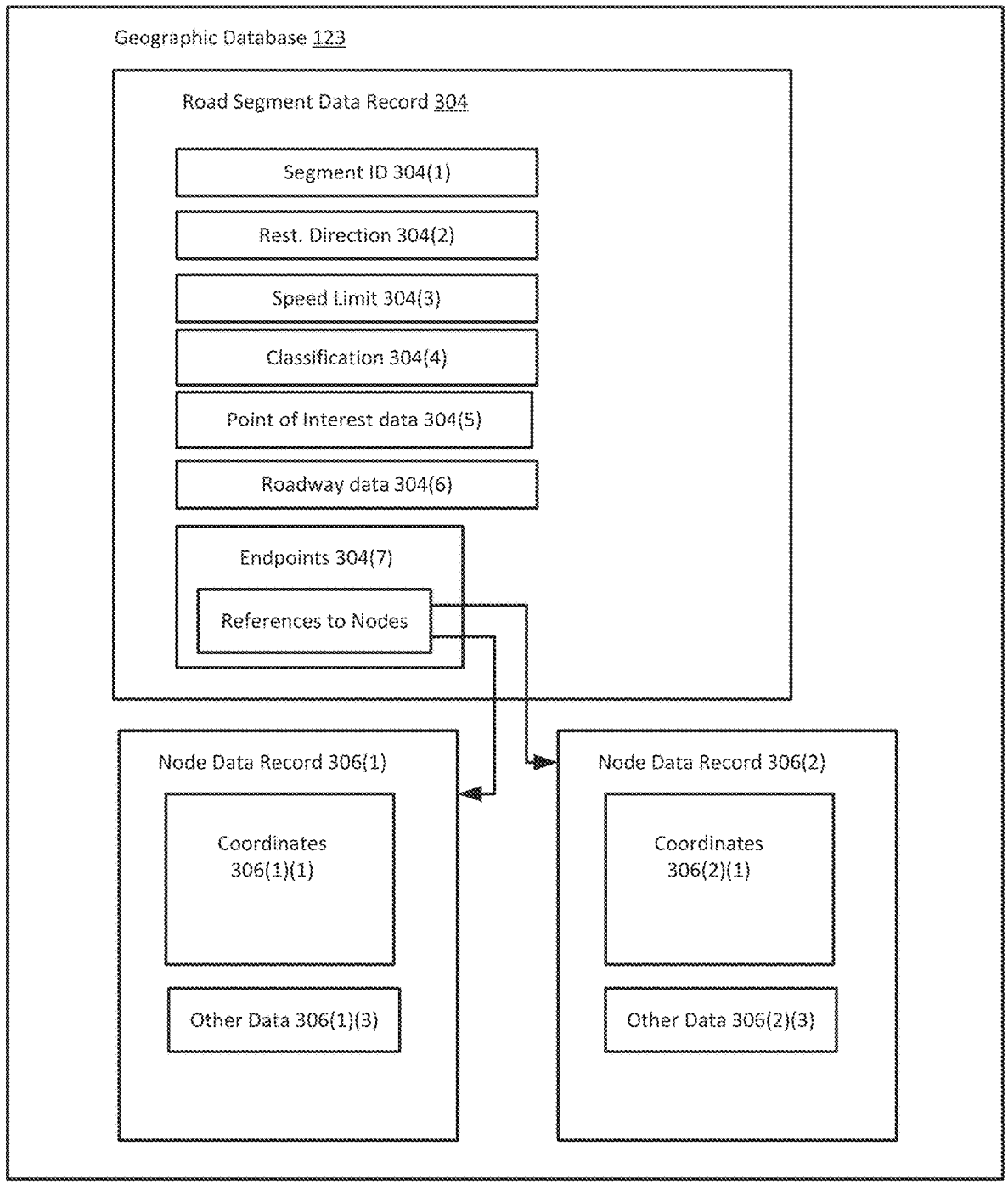
FIG. 10 depicts an example structure of the geographic database.

FIG. 10 shows some of the components of a road segment data record 304 contained in the geographic database 123 according to one embodiment. The road segment data record 304 may include a segment ID 304(1) by which the data record can be identified in the geographic database 123. Each road segment data record 304 may have associated information such as "attributes", "fields", etc. that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record 304 may include data 304(5) related to points of interest. The road segment data record 304 may include data 304(6) that describes lane configurations. The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. The road segment data record 304 may also include or be associated with other data 304(7) that refer to various other attributes of the represented road segment such as coordinate data for shape points, POIs, signage, other parts of the road segment, etc. The various attributes associated with a road segment may be included in a single road segment record or may be included in more than one type of record which cross-references each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 10 also shows some of the components of a node data record 306 which may be contained in the geographic database 123. Each of the node data records 306 may have associated information (such as "attributes", "fields", etc.) that allows identification of the road segment(s) that connect to it and/or a geographic position (e.g., latitude and longitude coordinates). For the embodiment shown in FIG. 10, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

The data in the geographic database 123 may be organized using a graph that specifies relationships between entities. A location graph is a graph that includes relationships between location objects in a variety of ways. Objects and their relationships may be described using a set of labels. Objects may be referred to as "nodes" of the location graph, where the nodes and relationships among nodes may have data attributes. The organization of the location graph may be defined by a data scheme that defines the structure of the data. The organization of the nodes and relationships may be stored in an ontology which defines a set of concepts where the focus is on the meaning and shared understanding. These descriptions permit mapping of concepts from one domain to another. The ontology is modeled in a formal knowledge representation language which supports inferencing and is readily available from both open-source and proprietary tools.

The traffic violation data is uploaded or transmitted to the mapping system 121/server 125 using the network. The traffic violation data may be acquired over a period of time and then acquired by the server 125. Different platforms or devices 122 may acquire data differently and may provide the data in different batches or formats to the server 125 for analysis and processing.

Referring back to FIG. 7, at act A120, the server 125 trains/configures a model to identify traffic violation hotspots using the traffic violation data from the first region. The at least one model may be trained, configured, and updated at the mapping system 121, for example by the server 125. The server 125 may iteratively train or configure the model using a set of historical training data that includes annotated (known or identified) traffic violation events for a first region. The training data is input into the model which outputs a prediction (probability). The output is compared the annotation. The comparison is used to adjust the model/network until the model is optimized. For the machine learning task described above and herein, the model (also referred to as machine learning model, neural network, or network) may be trained using one or more optimization algorithms such as gradient decent. Training using an optimization method such as gradient descent includes determining how close the model estimates the target function. The determination may be calculated a number of different ways that may be specific to the particular model being trained. The cost function involves evaluating the parameters in the model by calculating a prediction for the model for each training instance in the dataset and comparing the predictions to the actual output values and calculating an average error value (such as a value of squared residuals or SSR in the case of linear regression). In a simple example of linear regression, a line is fit to a set of points. An error function (also called a cost function) is defined that measures how good (accurate) a given line is. In an example, the function inputs the points and return an error value based on how well the line fits the data. To compute the error for a given line, in this example, each point (x, y) is iterated in the data set and the sum the square distances between each point's y value and the candidate line's y value is calculated as the error function. Gradient descent may be used to minimize the error functions. Given a function defined by a set of parameters, gradient descent starts with an initial set of parameter values and iteratively moves toward a set of parameter values that minimize the function. The iterative minimization is based on a function that takes steps in the negative direction of the function gradient. A search for minimizing parameters starts at any point and allows the gradient descent algorithm to proceed downhill on the error function towards a best outcome. Each iteration updates the parameters that yield a slightly different error than the previous iteration. A learning rate variable is defined that controls how large of a step that is taken downhill during each iteration.

Alternative optimization algorithms may be used. For example, stochastic gradient decent is a variation of gradient decent that may be used. Nesterov accelerated gradient (NAG) is another algorithm that solves a problem of momentum when an algorithm reaches the minima i.e., the lowest point on the curve. Adaptive Moment Estimation (Adam) is another method that computes adaptive learning rates for each parameter. In addition to storing an exponentially decaying average of past squared gradients like AdaDelta, Adam also keeps an exponentially decaying average of past gradients M(t), similar to momentum. Depending on the model, different types of optimization algorithms, e.g., first order or second order (hessian) may be used. Any algorithm that executes iteratively by comparing various solutions until an optimum or a satisfactory solution is found may be used to train the model.

The trained model may be stored at the server 125, for example in the memory 804. The trained model may be deployed to a networked cloud-based environment or to one or more devices 122.

At act A130, the device 122 acquires real-time data while traversing a location in a second region for which historical traffic violation data is limited. The real-time data may include either or both of mapping data (feature data, for example as stored in the geographic database 123) and/or sensor data (acquired by one or more sensors for a vehicle in communication with the device 122).

At act A140, the trained model generates a probability score that represents how probable the location in the second region is to be a traffic violation hotspot. The at least one model may be stored locally at the device 122 in the memory 904. The memory 904 may be a volatile memory or a non-volatile memory. The memory 904 may include one or more of a read only memory (ROM), random access memory (RAM), a flash memory, an electronic erasable program read only memory (EEPROM), or other type of memory. The memory 904 may be removable from the mobile device 122, such as a secure digital (SD) memory card.

The device 122 may communicate with the server 125 to receive updates for the trained model. The communication interface 918 and/or communication interface 918 may include any operable connection. An operable connection may be one in which signals, physical communications, and/or logical communications may be sent and/or received. An operable connection may include a physical interface, an electrical interface, and/or a data interface. The communication interface 918 provides for wireless and/or wired communications in any now known or later developed format. The radio 909 may be configured to radio frequency communication (e.g., generate, transit, and receive radio signals) for any of the wireless networks described herein including cellular networks, the family of protocols known as WIFI or IEEE 802.11, the family of protocols known as Bluetooth, or another protocol.

At act A150, the device 122 generates an alert for the location based on the probability score. In an embodiment, the device 122 determines, that the probability score exceeds a threshold score. The threshold score may be set by the device 122, an operator, the mapping system 121, the server 125 or by other means. The threshold may be region specific or may be based on the type of vehicle that is being driven. Different fleets or organizations may have different standards for safety. Different autonomous vehicles may also be better equipped to handle certain circumstances.

In an embodiment, the server 125 or device 122 may publish or display the probability score for traffic violations. For example, if the mean of the traffic violation for a given area and for given hour is same (or less) as that of the nation (or county or state) mean then the location is not flagged. If the mean of the traffic violation for a given area and for given hour is greater than that of the national (or county or state) mean then the location (or area) by 15% then it is flagged as mild traffic violation zone. This region is shown as amber color on the map. If the mean of the traffic violation for a given area and for given hour is greater than that of the national (or county or state) mean then the location (or area) by 25% then it is flagged as moderate traffic violation zone. This region is shown as light red color on map. If the mean of the traffic violation for a given area and for given hour is greater than that of the national (or county or state) mean then the location (or area) by 50%+ then it is flagged as high traffic violation zone. This region is shown as dark red color on the map.

In an embodiment, the device 122 generates and transmits an alert for the location based on the probability calculated by the machine learning model. The alert may be an update to a displayed map. The alert may be, for example a routing instruction to take a different route. The routing instructions may be provided by display 914. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

A user may interact with the map/navigation system/alert using an input device 916. The input device 916 may be one or more buttons, keypad, keyboard, mouse, stylus pen, trackball, rocker switch, touch pad, voice recognition circuit, or other device or component for inputting data to the mobile device 122. The input device 916 and display 914 may be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

The alert and probability information may be used to be aware of such risks or avoid those hotspots. In an example, when the vehicle is approaching the traffic violation hotspot, the device 122 might prompt the user to take over the control of the vehicle. The controller 900 may reduce speed or behaviors in such areas. In a practical example, vehicles may drive in the opposite lane (overtaking) to go over accidents which happened on their lane. If an accident is detected in a given area on a given lane, it increases the risk of people using the opposite lane to go over it (depending on the area, validated by probe data in that area). Based on this information, the device 122 might predict that when an accident happens in the future on that same lane and conditions are similar (traffic, weather, time of day, etc), then there will likely be people attempting to overtake on the opposite lane, leading to increased safety risks. If there is long congestion on one side of the road and the other side of the road has a sparse vehicle then the motorist may have the tendency to drive from the wrong side of the read and beat the congestion. Similarly, in a commercial area (where there are offices) there may be higher cases of traffic light jumping during peak hours (probable reason—getting late for work). Such patterns can be identified from this traffic violation hotspots. Identification of predictors can help in reducing traffic related risks.

In response to the alert, a vehicle or driver may decide to take a different route if the dynamically computed risk is over a given threshold. Vehicles in both directions may be informed of the increased risk for a specific time period. Pedestrians may be informed that dangerous driving is more likely to occur when a vehicle is stopped on a street with given characteristics (e.g., one driving lane in each direction). Police/assistance may be notified to come and support faster the incident that occurred in such areas with higher associated risk. Police or emergency services may also preemptively come and control to prevent such dangerous behaviors in a proactive way thanks to the prediction capability.

Figure 11:
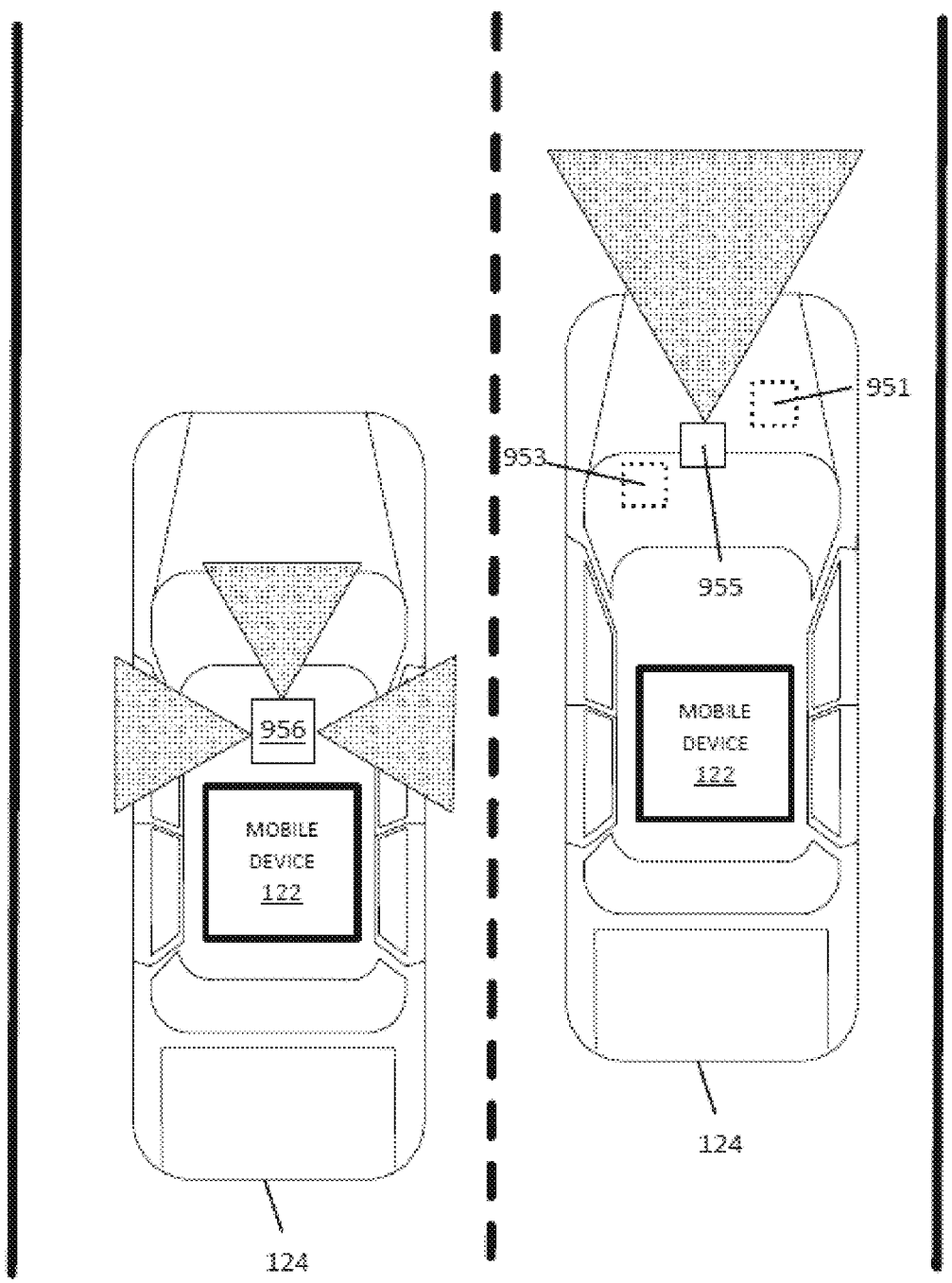
FIG. 11 depicts an example autonomous vehicle according to an embodiment.

In an embodiment, the device 122 may alert or otherwise provide instructions for an autonomous vehicle to perform a maneuver. FIG. 11 illustrates an exemplary vehicle 124 for providing location-based services, navigation services, or applications using the systems and methods described herein as well as collecting data for such services or applications described herein. The vehicles 124 may include a variety of devices that collect position data as well as other related sensor data for the surroundings of the vehicle 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively, or additionally, the one or more detectors or sensors may include an accelerometer built or embedded into or within the interior of the vehicle 124. The vehicle 124 may include one or more distance data detection device or sensor, such as a LIDAR device. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server 125. The network may be the Internet or connected to the internet.

The sensor array may include one or more sensors configured to detect surroundings of the vehicle 124. The sensor array may include multiple sensors. Example sensors include an optical distance system such as LiDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the lane marking indicators (lane marking type, lane marking intensity, lane marking color, lane marking offset, lane marking width, or other characteristics) received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) received from geographic database 123 and the server 125 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) received from geographic database 123 and the server 125 and driving commands or navigation commands.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method for predicting traffic violation hotspots, the method comprising:
   acquiring historical traffic violation data for a plurality of locations in a first region;
   training a model to identify traffic violation hotspots using the historical traffic violation data;
   acquiring real-time data while traversing a location in a second region for which historical traffic violation data is limited;
   generating, by the trained model using the real-time data, a probability score that represents how probable the location in the second region is to be a traffic violation hotspot; and
   generating an update to a map displayed in a vehicle for the location based on the probability score, wherein the update to the displayed map includes one or more routing instructions for a different route associated with the second region.

2. The method of claim 1, wherein the historical traffic violation data comprises map feature data and identified traffic violations, wherein the model is trained to learn which map features are relevant to traffic violations, wherein once those map features are identified and weighted in the trained model, the trained model is configured to generate the probability score based on the real-time data that comprises real-time acquired map feature data.

3. The method of claim 2, wherein the map feature data comprises at least two of data related to a functional class of a road, category of a road, a number of lanes, a speed limit, a travel direction, or a presence of a physical divider.

4. The method of claim 1, wherein a respective traffic violation hotspot comprises a location that exhibits a higher-than-average number of traffic violations than other locations in a defined region.

5. The method of claim 4, wherein the traffic violations include at least one of traffic light jumping, wrong way driving, over speeding, not wearing seatbelt, avoiding stop signs and red lights, distracted driving, or passing other vehicles in a no-passing zone.

6. The method of claim 1, wherein the historical traffic violation data comprises sensor data acquired by a vehicle and related traffic violations, wherein the model is trained to input real-time sensor data.

7. The method of claim 6, wherein the sensor data comprises image data acquired by the vehicle.

8. The method of claim 1, wherein the historical traffic violation data comprises sensor data acquired by a vehicle, map feature data, and identified traffic violations.

9. A system for calculating a probability of a traffic violation, the system comprising:
   one or more navigation devices configured to acquire sensor data related a plurality of locations on a roadway;
   a mapping system comprising:
      a geographic database configured to store map feature data for the plurality of locations; and
      a server configured to store a first machine learning model configured to generate a first probability score when input real-time sensor data for a location for which there is limited traffic violation data, the server further configured to store a second machine learning model configured to generate a second probability score when input real-time mapping data for the location;
   wherein the server is configured to provide the first probability score, the second probability score, or the first probability score and the second probability score to the one or more navigation devices, wherein the server is configured to provide an update to a map displayed in a vehicle for the location based on the probability score, wherein the update to the displayed map includes one or more routing instructions for a different route associated with the location.

10. The system of claim 9, wherein the one or more navigation devices are configured to store a copy of the first machine learning model and a copy of the second machine learning model and apply the first machine learning model and the second machine learning model when traversing a region comprising at least the location to determine a risk of a traffic violation at an upcoming location for a device of the one or more navigation devices.

11. The system of claim 9, where the server is configured to generate a combined probability score to provide to the one or more navigation devices, the combined probability score calculated as a weighted average of the first probability score and the second probability score.

12. The system of claim 9, wherein the map feature data comprises at least two of data related to a functional class of a road, category of a road, a number of lanes, a speed limit, a travel direction, or a presence of a physical divider.

13. The system of claim 9, wherein the traffic violation comprises a traffic light jumping, wrong way driving, over speeding, not wearing seatbelt, avoiding stop signs and red lights, distracted driving, or passing other vehicles in a no-passing zone.

14. The system of claim 9, wherein the one or more navigation devices are further configured to generate an alert based on the first probability score, the second probability score, or the first probability score and the second probability score.

15. An apparatus comprising:
   at least one processor; and
   at least one memory including computer program code for one or more programs; the at least one memory configured to store the computer program code configured to, with the at least one processor, cause the at least one processor to:
   acquire data related to a location of a roadway for a first region;
   generate, using at least one model trained using machine learning, a probability score for how probable is the location is to be a traffic violation hotspot, the at least one model trained using historical traffic violation data from a second region;
   determine that the probability score exceeds a threshold score; and
   generate an update to a map displayed in a vehicle for the location, wherein the update to the displayed map includes one or more routing instructions for a different route associated with the second region.

16. The apparatus of claim 15, wherein the data related to the location comprises map feature data from the first region, wherein the at least one model is trained to learn which map features are relevant based on map features and identified traffic violations in the second region, wherein once the map features are identified and weighted in the at least one model, the at least one model is configured to determine the generate the probability score based on the acquired map feature data for the first region.

17. The apparatus of claim 16, wherein the map feature data comprises at least two of data related to a functional class of a road, category of a road, a number of lanes, a speed limit, a travel direction, or a presence of a physical divider.

18. The apparatus of claim 15, wherein the data related to the location comprises sensor data acquired by a vehicle from the first region, wherein the at least one model is trained to input sensor data and output the probability score that the location is traffic violation hotspot.

19. The apparatus of claim 15, wherein the data related to the location comprises map feature data and sensor data acquired by a vehicle in the first region, wherein the at least one model comprises a first model and a second model, wherein the first model is trained to learn which map features are relevant based on map features and traffic violations in the second region and output a first probability score, wherein the second model is trained to input sensor data and output a second probability score, wherein the probability score is calculated as a weighted average of the first probability score and the second probability score.

* * * * *